(12) United States Patent
Harter

(10) Patent No.: US 12,311,750 B2
(45) Date of Patent: May 27, 2025

(54) AIR GUIDING DEVICE OF A MOTOR VEHICLE BODY OF A MOTOR VEHICLE

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 200 days.

(21) Appl. No.: 18/092,472

(22) Filed: Jan. 3, 2023

(65) Prior Publication Data

US 2023/0286372 A1 Sep. 14, 2023

(30) Foreign Application Priority Data

Mar. 9, 2022 (DE) .................. 10 2022 105 548.5

(51) Int. Cl.
B60K 11/08 (2006.01)

(52) U.S. Cl.
CPC .................. B60K 11/085 (2013.01)

(58) Field of Classification Search
CPC .................. B60K 11/085; B60Y 2304/07
See application file for complete search history.

(56) References Cited

U.S. PATENT DOCUMENTS

| | | | | |
|---|---|---|---|---|
| 1,427,228 | A * | 8/1922 | Power | G03B 9/10 352/165 |
| 4,753,288 | A * | 6/1988 | Harvey | F01P 7/10 123/41.58 |
| 10,160,309 | B2 * | 12/2018 | Schwarz | B60K 11/085 |
| 11,028,739 | B2 * | 6/2021 | Riley | F01L 13/0005 |
| 11,413,956 | B2 * | 8/2022 | Gerber | B60K 11/085 |
| 2007/0196196 | A1 * | 8/2007 | Schorling | F16B 21/04 411/555 |
| 2014/0308890 | A1 * | 10/2014 | Schneider | B60K 11/085 454/335 |
| 2017/0341505 | A1 | 11/2017 | Knauer | |
| 2021/0060841 | A1 * | 3/2021 | Sugahara | B29C 45/1775 |

FOREIGN PATENT DOCUMENTS

| | | |
|---|---|---|
| CN | 204100523 U | 1/2015 |
| DE | 10 2006 053 883 A1 | 5/2008 |
| DE | 102011078691 A1 | 1/2013 |
| DE | 10 2016 209 156 A1 | 11/2017 |
| DE | 10 2019 135 156 A1 | 9/2020 |
| DE | 102019109799 A1 | 10/2020 |
| DE | 10 2021 103 951 A1 | 8/2022 |
| GB | 2082520 A | 3/1982 |

* cited by examiner

*Primary Examiner* — Kurt Philip Liethen
(74) *Attorney, Agent, or Firm* — Buchanan Ingersoll & Rooney PC

(57) ABSTRACT

An air guiding device of a motor vehicle body of a motor vehicle includes a slat arrangement having at least two slats arranged to be rotatable about their axes of rotation. The two slats are operably connected to a coupling rod for motion transmission. A coupling unit is formed between the slat and the coupling rod. The coupling unit includes a first coupling element and a second coupling element. The second coupling element encompasses the circumference of the first coupling element. A securing element of the coupling unit is designed for the secure connection between the first coupling element and the second coupling element. The securing element extends from the first coupling element in a radial direction.

6 Claims, 3 Drawing Sheets

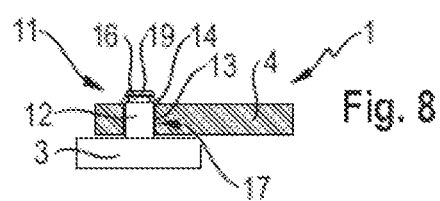
Fig. 8
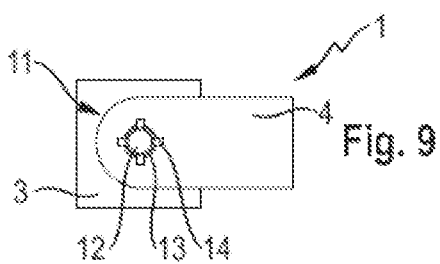
Fig. 9
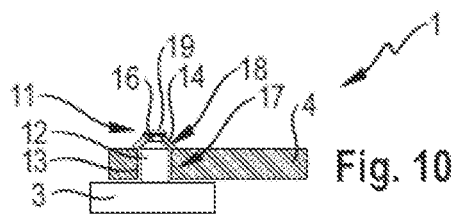
Fig. 10
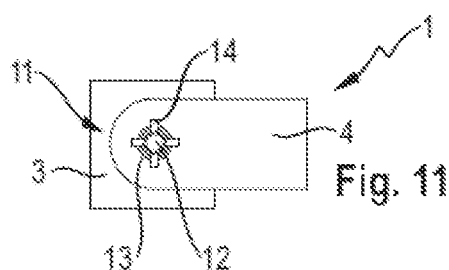
Fig. 11
Fig. 12
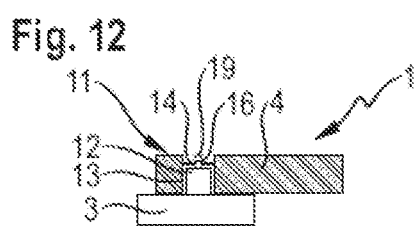
Fig. 13
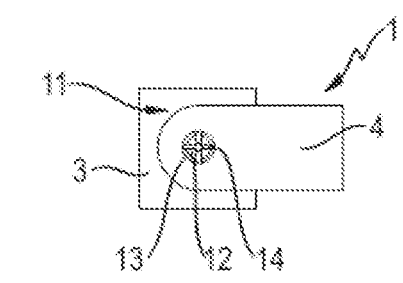
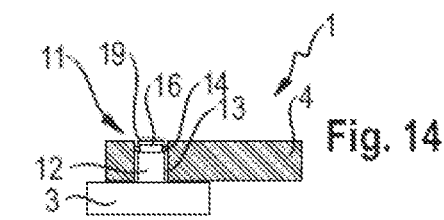
Fig. 14
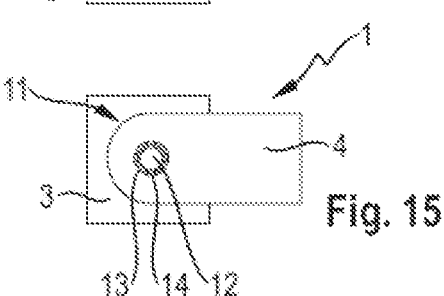
Fig. 15

AIR GUIDING DEVICE OF A MOTOR VEHICLE BODY OF A MOTOR VEHICLE

CROSS-REFERENCE TO RELATED APPLICATION

This application claims priority to German Patent Application No. 10 2022 105 548.5, filed Mar. 9, 2022, the content of such application being incorporated by reference herein in its entirety.

FIELD OF THE INVENTION

The invention relates to an air guiding device of a motor vehicle body of a motor vehicle.

BACKGROUND OF THE INVENTION

Air guiding devices used to influence an air flow around and/or through the motor vehicle body are known. Air guiding devices are thus used in the front region of the motor vehicle body, wherein they allow a defined air flow to be achieved in the front region of the motor vehicle body, e.g., for a flow of air into a cooling unit of the motor vehicle.

Flow channels of the air guiding devices in the front region equipped with a slat arrangement are known, the slat arrangement preferably being movable, so that the inlet opening of the air guiding device formed in the front region is variable and therefore controllable. A flow cross-section of the flow channel can thus be changed with the aid of the slat arrangement, e.g., so that a coefficient of air resistance and a power demand dependent on the coefficient of air resistance can be reduced, thus leading to, e.g., an increased range of the motor vehicle.

DE 10 2019 109 799 A1, which is incorporated by reference herein, thus discloses an air guiding device of a motor vehicle body having a plurality of slats and a driver rod, wherein the slats in each case comprise a driver pin, which in each case is connected to two clamping jaws of the driver rod, and wherein the connection between the slats and the driver rod is further secured in each case by means of a mounting element.

An air guiding device of a motor vehicle body of a motor vehicle can be gathered from DE 10 2011 078 691 A1, which is incorporated by reference herein, wherein the air guiding device possesses a slat arrangement with a first slat and a second slat, wherein the first slat is connected to an actuator, which initiates a motion of the first slat, which is connected to the second slat in a motion-transmitting manner.

CN 204100523 U, which is incorporated by reference herein, discloses an air guiding device for an interior of a motor vehicle body, said device comprising a slat arrangement, wherein slats of the slat arrangement are connected to one another with the aid of a coupling rod. The individual slats are connected to the coupling rod by means of a bayonet closure.

An air guiding device of a motor vehicle body of a motor vehicle can be gathered from GB 2082520 A, which is incorporated by reference herein, wherein the air guiding device possesses a slat arrangement having a first slat and a second slat, wherein each of the slats comprises a pin that is received by a moving rod of a kinematic motion means of the air guiding device. The pin is secured to the moving rod with the aid of a clip.

SUMMARY OF THE INVENTION

An inventive air guiding device of a motor vehicle body of a motor vehicle comprises a slat arrangement, wherein the slat arrangement comprises at least two slats, which are arranged to be rotatable about their axes of rotation. The two slats are operably connected to a coupling rod used for motion transmission. A coupling unit is formed between the slat and the coupling rod, wherein the coupling unit possesses a first coupling element and a second coupling element. The second coupling element is designed to encompass the diameter of the first coupling element. A securing element of the coupling unit is designed for a secure connection between the first coupling element and the second coupling element, wherein the securing element is designed to extend away from the first coupling element in a radial direction. According to aspects of the invention, the securing element is operably designed to bring about the secure connection between the first coupling element and the second coupling element in a symmetrical motion relative to the longitudinal axis of the coupling unit. The symmetrical motion of the securing element used for bringing about the secure connection between the first coupling element and the second coupling element, i.e., during the joining of the two coupling elements, results in a stable securing element which will potentially not have already been damaged or overloaded during the joining process. Another advantage is that of achieving a simple, and thus inexpensive, air guiding device.

In one configuration of the air guiding device according to aspects of the invention, the securing element is designed to engage in a recess. A reliable loss protection is advantageously provided as a result.

In one cost-effective configuration, said symmetrical motion is a rotational motion around the longitudinal axis of the coupling unit. In terms of cost-effectiveness, given that the rotational motion already takes place during a basic motion of the slat arrangement, basic elements of the slat arrangement can also be used, and complex additional components are not necessarily required. For example, the coupling unit is designed to bring about a closure in the form of a bayonet closure, so that the first coupling element and the second coupling element are operably designed for a rotational motion relative to one another, wherein the securing element serves for loss protection during operation of the air guiding device.

Furthermore, the air guiding device is simply and inexpensively designed insofar as the securing element is designed in the form of a nose, preferably on the first coupling element. A cost-effective assembly can thus be achieved in a simple manner. For example, in its assembled position the nose is at the same "clock position" as a corresponding recess in the coupling rod. After the coupling rod has been fitted, it is rotated into its mounted position and thus protected against loss, which is preferably achieved using a bayonet closure.

In a further configuration of the air guiding device according to aspects of the invention, a further securing element is formed on the first coupling element for improved loss protection. In this case, one or more securing elements can preferably be implemented in the form of noses. Given that effective assembly and a preferable loss protection are achievable, a maximum of four securing elements are attached.

In an alternative configuration of the air guiding device according to aspects of the invention, the securing element is operably designed for a symmetrical motion in the axial direction of the longitudinal axis. In other words, the securing element is designed to be symmetrically guidable along the longitudinal axis such that, even during this motion, no asymmetrically lateral forces occur which could lead to the damage or unstable positioning of the securing element.

To secure the securing element in the coupling unit, the recess is designed in the form of a groove formed in the first coupling element and/or the second coupling element.

Advantageously, the securing element is configured in the form of a spring element. The spring element could be made in the form of a spring arm or spring washer. The securing element is optionally located on the slat, or on the coupling rod. Mounting is possible in any angular position and can be performed by, e.g., positive pressure on the securing element. The securing element thereby engages in the recess, which is designed in the form of the groove formed in the first coupling element. The groove, and thus the recess, can be formed circumferentially or in sections. Several securing elements, e.g., in the form of spring arms, can also be arranged in a circular manner, wherein a maximum of six spring arms should be arranged (for the sake of easy assembly and/or disassembly). Likewise, several securing elements could also be arranged in series along the longitudinal axis of the coupling unit.

In overall terms, by means of the air guiding device according to aspects of the invention an air guiding device is achieved which is also able to reliably absorb increasing forces acting on the connection between the slat and the coupling rod, even given ever-increasing slat loads, e.g., due to higher air forces as the result of higher maximum velocities. In other words, an air guiding device is provided which can transmit occurring forces in a sturdy and reliable manner, wherein a very good loss protection as well as low-friction rotatability may be realized.

BRIEF DESCRIPTION OF THE DRAWINGS

Further advantages, features, and details of the invention will arise from the following description of preferred embodiment examples as well as with the aid of the drawings. The features and feature combinations specified in the foregoing description, as well as the features and feature combinations specified hereinafter in the description of the drawings and/or shown alone in the drawings, are able to be used not only in the respectively indicated combination, but also in other combinations, or on their own, without departing from the scope of the invention. Here:

FIG. 8 shows a sectional view of the coupling unit of an air guiding device according to aspects of the invention in a third embodiment example, FIG. 9 shows an overhead view of the coupling unit of the air guiding device according to aspects of the invention shown in FIG. 8, FIG. 10 shows a sectional view of the coupling unit of an air guiding device according to aspects of the invention in a fourth embodiment example, FIG. 11 shows an overhead view of the coupling unit of the air guiding device according to aspects of the invention shown in FIG. 10, FIG. 12 shows a sectional view of the coupling unit of an air guiding device according to aspects of the invention in a fifth embodiment example, FIG. 13 shows an overhead view of the coupling unit of the air guiding device according to aspects of the invention shown in FIG. 12, FIG. 14 shows a sectional view of the coupling unit of an air guiding device according to aspects of the invention in a sixth embodiment example, and FIG. 15 shows an overhead view of the coupling unit of the air guiding device according to aspects of the invention shown in FIG. 14.

DETAILED DESCRIPTION OF THE INVENTION

Figures 1, 2:
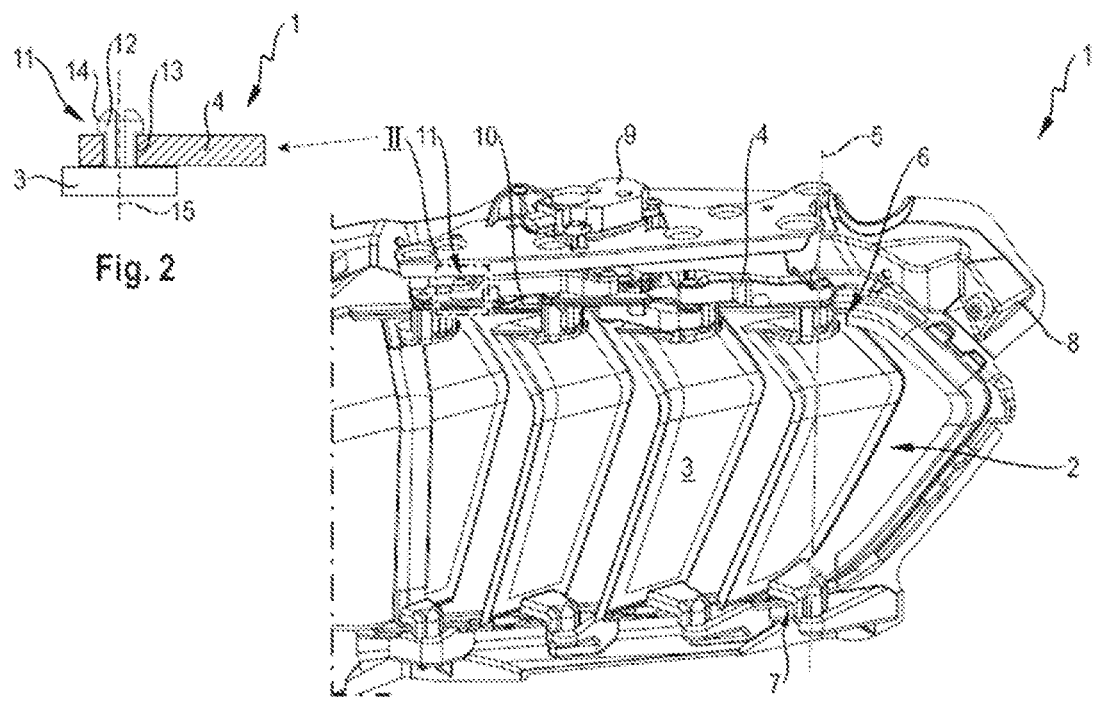
FIG. 1 shows a perspective view of an air guiding device of a motor vehicle body of a motor vehicle according to the prior art.
FIG. 2 shows a detailed view II of a section of a coupling unit of the air guiding device according to FIG. 1.

An air guiding device 1 of a motor vehicle body of a motor vehicle according to the prior art (not shown in greater detail), is illustrated in a perspective view, as shown in FIG. 1. The air guiding device 1 comprises a slat arrangement 2 with four slats 3, which are designed to be synchronously movable with respect to one another. The slats 3 are designed to stimulate motion among one another, wherein a coupling rod 4 is formed between two slats 3. In other words, two slats 3 are each connected to one another for motion transmission by means of the coupling rod 4.

In principle, a motion of the slats 3 is a rotational motion or a pivoting motion around the axis of rotation 5 of said slats. The slats 3, which are designed both conventionally and in the present embodiment example to be predominantly plate-like, are rotatably supported in a frame 8 of the slat arrangement 2 at their first end 6 and at their second end 7, which is formed to face away from the first end 6. The slats 3 are rotatably received in this frame 6.

The rotational motion which the slats 3 are designed to synchronously perform is initiated by an actuator 9 of the air guiding device 1 and is conventionally transmitted to at least one of the slats 3 by means of a kinematic rod 10. Since the slats 3 are connected to one another by means of the coupling rods 4, motion is thus transferred starting from one of the slats 3 and then transmitted to the remaining slats 3.

A movable connection in the form of a coupling unit 11 is formed between the slat 3 and the coupling rod 4, which connection comprises a first coupling element 12 and a second coupling element 13, wherein in the present embodiment the slat 3, the first coupling element 12, and the coupling rod 4 are associated with the second coupling element 13.

The coupling unit 11 is essentially designed to bring about relative motion between the slat 3 and the coupling rod 4, to bring about a retaining attachment of the slat 3 to the coupling rod 4, or vice versa, and to transmit tensile and compressive forces.

The coupling unit 11 according to the prior art is designed as shown in the detail view II of FIG. 2. The coupling unit 11 comprises the first coupling element 12 in the form of a cylindrical section-shaped bearing pin, which comprises the securing element 14 in the form of a so-called "hat" for bringing about a loss protection, which is supported on the coupling rod 4. The second coupling element 13 is designed in the form of a hole which completely penetrates the coupling rod 4, wherein the first coupling element 12 and the second coupling element 13 each have a coaxial longitudinal axis which corresponds to a longitudinal axis 15 of the coupling unit 11. In order to bring about the secure connection between the first coupling element 12 and the second coupling element 13, and thus to connect the two coupling elements 12, 13, the first coupling element 12 is pressed in towards the longitudinal axis 15 so that the securing element 14 performs an asymmetrical motion with respect to the longitudinal axis 15 due to a tilting motion being performed relative to the longitudinal axis 15.

An air guiding device 1 according to aspects of the invention comprises the securing element 14, which is operably designed for bringing about the secure connection between the first coupling element 12 and the second coupling element 13 in a symmetrical motion relative a longitudinal axis 15 of the coupling unit 11.

Figure 3:
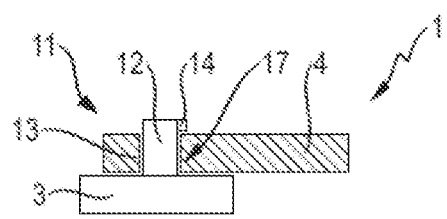
FIG. 3 shows a sectional view of the coupling unit of an air guiding device according to aspects of the invention in a first embodiment example.
Figure 4:
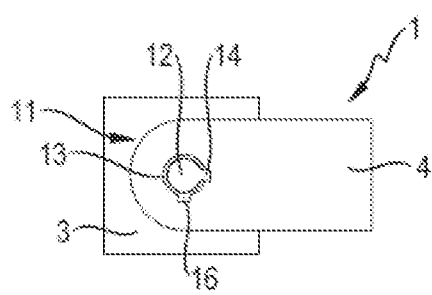
FIG. 4 shows an overhead view of the coupling unit of the air guiding device according to aspects of the invention shown in FIG. 3.
Figure 5:
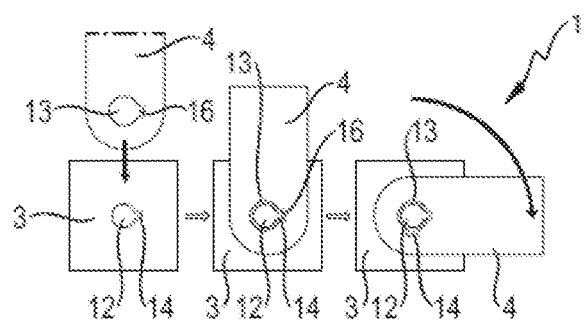
FIG. 5 shows an overhead view of three mounting positions of the coupling unit of the air guiding device according to aspects of the invention shown in FIG. 3.

In FIGS. 3 to 5, the coupling unit 11 of the air guiding device 1 according to aspects of the invention is illustrated, in a first embodiment example, in a section, in an overhead view, and in three assembly steps in an overhead view.

The coupling unit 11 comprises the first coupling element 12 in the form of a cylinder, in particular a solid cylinder, which possesses the securing element 14, which is operably designed to lock the coupling rod 4 to the slat 3. In the present exemplary embodiment, the securing element 14 is designed in the form of a nose which, after assembly of the coupling rod 4 and the slat 3, extends across the coupling rod 4 in the radial direction of the first coupling element 12. The second coupling element 13 is designed in the form of an opening extending through the coupling rod 4 that is formed in complementary fashion with respect to a cross section of the first coupling element 12 in the area of the securing element 14. The first coupling element 12 encompasses the entire circumference of the second coupling element 13.

FIG. 4 is an overhead view of the coupling unit 11 with the slat 3 with the coupling rod 4 in their mounted positions. The securing element 14 is offset relative to a recess 16 of the second coupling element 13 (in the present embodiment example arranged at a 90° angle) so that an axially secure connection is achieved between the slat 3 and the coupling rod 4.

FIG. 5 shows the mounting of the slat 3 with the coupling rod 4 in three mounting steps, viewed from left to right. In a first step, the coupling rod 4 is oriented in a direction transverse to its later end position relative to the slat 3, or vice versa, so that the second coupling element 13 can receive the first coupling element 12 in a second step. In the second step, the first coupling element 12 and the securing element 14, (which in this embodiment example is designed to be integral with the first coupling element 12, in particular integrally formed with said first coupling element, and the recess 16 of the second coupling element 13 are aligned in a congruent manner, so that the first coupling element 12 having the securing element 14 can be received by the second coupling element 13 and its recess 16. In a third step, the coupling rod 4 is rotated in relation to the slat 3, or vice versa, so that the recess 16 is no longer arranged in a congruent manner with the securing element 14. As a result, the securing element 14 then constitutes an axial limit of motion of the coupling rod 4 designed along the longitudinal axis 15. In the first exemplary embodiment presented, the securing element 14 and the recess 16 are arranged at a 90° angle to one another, but this could be a different value. Even an angle of 1° could bring about a secure connection between the slat 3 and the coupling rod 4, wherein however a larger angle is preferable for a reliably secure connection.

Figure 6:
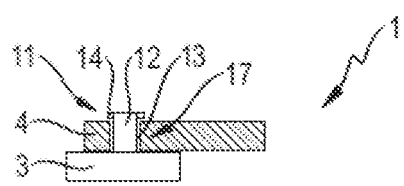
FIG. 6 shows a sectional view of the coupling unit of the air guiding device according to aspects of the invention in a second embodiment example.
Figure 7:
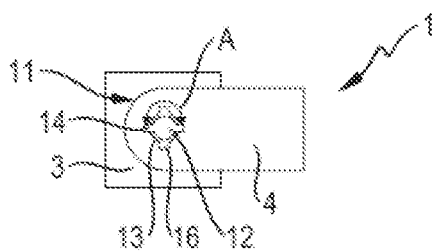
FIG. 7 shows an overhead view of the coupling unit of the air guiding device according to aspects of the invention shown in FIG. 6.

A second embodiment example of the air guiding device 1 according to aspects of the invention is depicted in FIG. 6. The first coupling element 12 comprises two securing elements 14, which are preferably attached to the first coupling element 12 at a distance A of 180°. FIG. 7 depicts an overhead view of the second embodiment example of the air guiding device 1 according to aspects of the invention.

In the first two embodiment examples, the securing element 14 is operably designed to bring about the secure connection between the first coupling element 12 and the second coupling element 13 in a symmetrical motion with respect to the longitudinal axis 15 in the form of a rotational motion around the longitudinal axis 15.

In the embodiment examples of the air guiding device 1 according to aspects of the invention described in greater detail hereinafter, the securing element 14 is operably designed for a symmetrical motion in the axial direction of the longitudinal axis 15.

FIGS. 8 and 9 illustrate a third embodiment example of the air guiding device 1 according to aspects of the invention, wherein it is shown in section in FIG. 8 and in an overhead view in FIG. 9. In this third embodiment example of the air guiding device 1 according to aspects of the invention, the first coupling element 12 is further designed in the form of a cylinder and, unlike the first two embodiment examples, comprises the recess 16 in the form of a groove designed to fully or partially encompass the first coupling element 12, and thus the cylinder. The groove 16 serves to receive the securing element 14, which is designed in the form of a spring element.

The securing element 14 is designed to be independent of the second coupling element 13 and the coupling rod 4, as well as being designed to be independent of the first coupling element 12. Said securing element is preferably made of metal. However, it could also be designed to be integral with the coupling rod 4 as an integral part of the second coupling element 13.

During the assembly of the air guiding device 1 according to aspects of the invention, the first coupling element 12 can be placed in the second coupling element 13 before the securing element 14 is pressed over the first coupling element 12, onto the second coupling element 13, and into the recess 16 or the groove.

Insofar as the securing element 14 is designed to be integral with the second coupling element 13, the secure connection between the coupling rod 4 and the slat 3 is brought about by either placing the second coupling element 13 on the first coupling element 12 and pressing it towards the slat 3, and/or pressing first coupling element 12 towards the coupling rod 4. The securing element 14 performs a symmetrical motion along the longitudinal axis 15.

A fourth embodiment example of the air guiding device 1 according to aspects of the invention is depicted in FIGS. 10 and 11, wherein it is illustrated in FIG. 10 in a section and in FIG. 11 in an overhead view. This embodiment example substantially corresponds to the third embodiment example, but, for improved support and improved joining of the securing element 14 between the recess 16 and an element section 17 of the first coupling element 12 designed as a bearing section, the first coupling element 12 comprises a frustoconical, i.e., conically designed, section 18.

FIGS. 12 and 13 illustrate a fifth embodiment example in a section or overhead view of the coupling unit 11 of the air guiding device 1 according to aspects of the invention. The significant difference between the third embodiment example and the fourth embodiment example is that the securing element 14 is fully received within the second coupling element 13 along the longitudinal axis 15. A space-optimizing air guiding device 1 is thus designed because the first coupling element 12 extends little, or not at all, beyond the coupling rod 4. Furthermore, a head section 19 of the first coupling element 12 is designed to be hemispherically shaped, wherein an improved joining between the slat 3 and the coupling rod 4 may also be achieved.

This head portion 19 could also be designed in spherical form. The securing element 14 can thus be inserted into the recess 16 using only a small amount of force.

The air guiding device 1 according to aspects of the invention is designed to be substantially similar in a sixth embodiment example shown n FIGS. 14 and 15, where it is depicted in section or in an overhead view. In this embodiment example, the head section 19 is designed to have a chamfer for improved joining of the fin 3 and the coupling rod 4, wherein the securing element 14 has a shorter radial extent than in the embodiment examples explained above.

The first coupling elements 12 in all of the embodiment examples are designed in the form of solid cylinders. These elements could also be designed in the form of hollow cylinders, wherein however providing sufficient wall thickness would be important for achieving a greater service life than in the prior art.

The securing elements 14 shown in FIGS. 8 to 15 are designed in the form of arms, thus spring arms, but they could also be designed as ring washers, thus in the form of spring washers.

It should be noted that, in the embodiment examples presented, the first coupling element 12 is formed on the slat 3, and the second coupling element 13 is formed on the coupling rod 4. The first coupling element 12 could also be formed on the coupling rod 4, and the second coupling element 13 on the slat 3.

LIST OF REFERENCE NUMBERS

1 Air guiding device
2 Slat arrangement
3 Slat
4 Coupling rod
5 Axis of rotation
6 First end
7 Second end
8 Frame
9 Actuator
10 Kinematic rod
11 Coupling unit
12 First coupling element
13 Second coupling element
14 Securing element
15 Longitudinal axis
16 Recess
17 Element section
18 Section
19 Head section
A Distance

What is claimed is:

1. An air guiding device of a motor vehicle body of a motor vehicle, said device comprising:
   a slat arrangement comprising at least two slats, which are arranged to be rotatable about respective axes of rotation, wherein the two slats are operably connected to a coupling rod for motion transmission,
   a coupling unit rotatably connecting one of the slats to the coupling rod, wherein the coupling unit comprises a first coupling element in the form of a pin and a second coupling element in the form of a hole, wherein the hole and the pin each extend along a longitudinal axis of the coupling unit, wherein the pin is mounted in the hole such that the hole of the second coupling element surrounds a circumference of the pin of the first coupling element, and wherein the pin is constrained within the hole in a radial direction that is orthogonal to the longitudinal axis of the coupling unit, and
   a securing element of the coupling unit that extends from the first coupling element in the radial direction, the securing element being configured to connect the first coupling element and the second coupling element such that the pin is constrained within the hole in an axial direction along the longitudinal axis of the coupling unit,
   wherein the securing element is configured to engage in a recess and wherein the recess is in the form of a groove in the first coupling element and/or the second coupling element,
   wherein the securing element is a washer that is positioned within the recess, and the recess is formed about the circumference of the pin.

2. The air guiding device according to claim 1, wherein said one of the slats is mounted onto the coupling rod in the axial direction along the longitudinal axis.

3. The air guiding device according to claim 1, wherein the washer is a spring element.

4. The air guiding device according to claim 3, wherein the washer is a spring washer.

5. A motor vehicle comprising the air guiding device of claim 1.

6. The air guiding device according to claim 1, wherein the pin is defined on said one of the slats and the hole is defined on said coupling rod.

* * * * *